July 6, 1926.
H. F. GEPHART
STEEL FISHING ROD
Filed Feb. 5, 1923
1,591,121
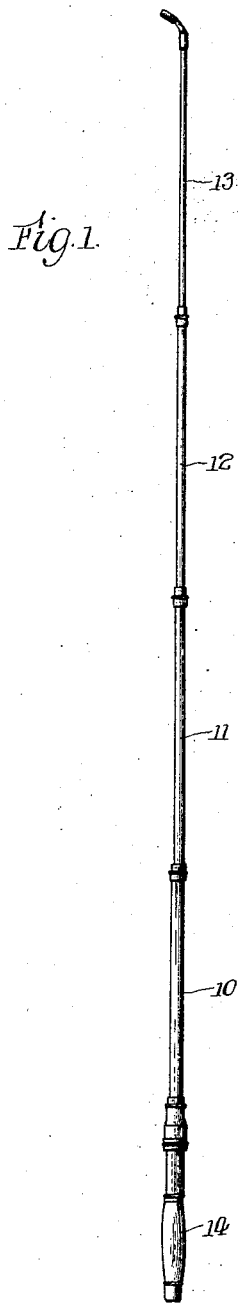
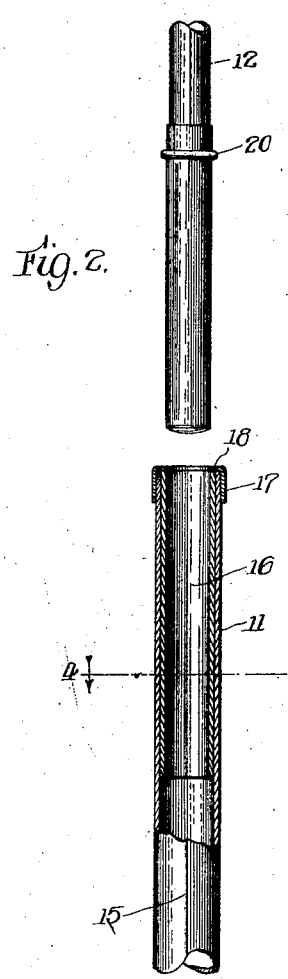
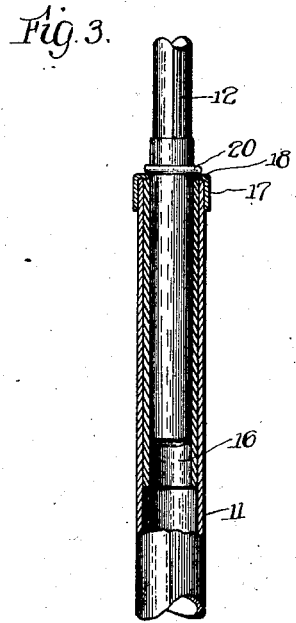
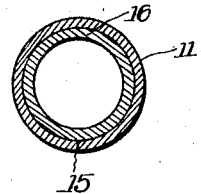
Inventor:
Harry F. Gephart
By Walter M. Fuller
Atty.
Witness:
A. J. Sauser Patented July 6, 1926.

1,591,121

UNITED STATES PATENT OFFICE.

HARRY F. GEPHART, OF CHICAGO, ILLINOIS.

STEEL FISHING ROD.

Application filed February 5, 1923. Serial No. 616,931.

The present invention aims to provide a steel or metal fishing rod or pole which can be manufactured more economically than has heretofore been customary and the jointed sections of which may be readily fitted together telescopically and as easily separated even though they have been assembled for a long period.

Formerly, it was usual and customary to make such hollow jointed or sectional fishing rods or poles from steel tubing having a longitudinal joint or seam, the end of each section, designed and intended to receive internally the ferrule-equipped end of the next section, being compressed or reduced in size to provide a suitable and appropriate internal diameter or caliber, such end then being reamed out to form a smooth interior of uniform definite size to accommodate the end of the next section of the fishing rod.

Such steel must necessarily be of spring or flexible quality with a capacity for ready bending and with the ability to return to its original form as soon as the strains are removed.

Steel of that type is difficult to form and smooth to shape internally with accuracy and with proper alignment and without tendency to weaken or open up the lengthwise seam.

Furthermore, with such steel tubular members internally receiving the brass ferrules or sleeves on the ends of the adjacent or companion sections of the fishing rod, there is a decided tendency after the parts of the structure have been assembled for some considerable length of time for them to become rusted or "frozen" together, so that it is quite difficult or actually impossible to pull them apart for storage in a small space.

My invention aims to overcome these faults and inconveniences and to provide a steel fishing rod or pole which can be produced at less cost of manufacture than formerly, and the sections of which can be readily separated even after long periods of time in which the parts of the fishing rod have remained assembled in the usual way.

To this end, I avoid reducing the end of the steel tubing and refrain from reaming out such end to secure the required fit of parts, but on the contrary, I permit such tubing to remain unchanged at its end and inside of it I insert a brass or alloy or other substantially noncorrosive liner or bushing and over the outer end of the tubing I fit a sleeve or ring which strengthens such tubing and removes all danger of its joint or seam opening up in service.

The end of the next section or part of the tubing is equipped externally with a brass or alloy or other appropriate noncorrosive ferrule having a bead or enlargement acting as a stop to limit the extent of its insertion in the bushing of the complementary section of tubing.

Thus the liner or bushing and the ferrule, preferably of the same practically non-oxidizing material, constitute the two cooperating elements which are designed to fit together telescopically to join together the two parts or sections of the fishing rod.

Such a structure is strong, its parts do not become unintentionally disassociated or separated; and, because of the lack of corrosion or rust, they may be easily separated or disjointed at any time without difficulty.

To enable those skilled in this art to have a full and complete understanding of this invention and the advantages accruing from its employment, in the accompanying drawing forming a part of this specification I have illustrated in detail, a preferred and desirable embodiment of the invention and for simplicity throughout the several views of the drawing, I have applied the same reference characters to like parts.

In this drawing:—

Figure 1 is an elevation of the entire fishing rod;

Figure 2 shows fragmentarily the end portions of two sections of such rod;

Figure 3 shows the same parts assembled; and

Figure 4 is an enlarged cross-section on line 4—4 of Figure 2.

Referring to this drawing, it will be perceived that the complete fishing rod, in this particular embodiment of the invention, is composed of four section or parts 10, 11, 12 and 13, although it will be readily understood that the invention is in no way limited to any particular number of sections of the rod.

As is usual, these several segments or units of the pole or rod are of progressively smaller diameter from the handle 14 secured to one end of the larger one to the end of the rod, whereby the latter may have the required resiliency, flexibility, and elasticity.

Inasmuch as the plurality of parts of the rod are fastened together by like or similar disconnectible joints only one of the latter need be described, such as is illustrated in Figures 2 and 3 on a larger scale than in Figure 1.

Considering, for example, the contiguous or proximate parts or units 11 and 12, it will be seen that each is composed of a section or length of steel tubing with a longitudinal butt joint 15, as is indicated most clearly in Figure 4, the two sections of tubing being of slightly different diameters for the reason specified above.

In the end of the tubular member 11 I insert and braze or weld fixedly in place a brass or alloy or other noncorrosive lining or bushing 16, one end of the latter being flush with the corresponding end of the tube.

Such end of the hollow cylindrical element 11 is also fitted externally with a confining ring or sleeve 17 having an inturned flange or rim 18 covering the ends of both parts 11 and 16, thus forming a neat finish for such end.

Inasmuch as such circular constraining band 17 snugly fits the tube, all danger of the joint or seam of the latter opening up or separating when the rod is in use and subjected to the usual strains incident to such service is overcome.

The adjacent end of the tube 12 has a brass or other non-oxidizing ferrule 19 fitted over and fixed immovably on it, the outside diameter of the ferrule adapting it to be received in, and held by friction in, the corresponding complementary bushing 16.

Thus the two parts of the rod are adapted to be telescopically, but detachably, fastened together by the lengthwise introduction of the ferrule-equipped end of the one tube into the bushing-equipped end of the companion tube, the extent of insertion being limited and restricted by a bead 20 forming part of the ferrule.

In Figure 2, the two sections of the structure are illustrated in withdrawn or separated condition, whereas in Figure 3 they are shown united ready for service.

It will be seen, therefore, that the novel and improved fishing rod accomplishes the specified and other objects and aims of the invention in a thoroughly satisfactory manner, particularly the economy in cost of production or manufacture and the avoidance of the sections of the rods from becoming adhered together in such manner as to prevent their easy disunion or disjunction without the exercise of any especial dexterity.

Those skilled in this art will readily understand that the invention is not limited and restricted to the precise and exact details of construction shown and described, but that the invention is susceptible of a variety of embodiments, all embodying or incorporating the fundamental principles of construction, although differing in mechanical details. Stated somewhat differently, more or less radical changes may be made in the structure presented without departure from the heart and essence of the invention and without the sacrifice of any of its substantial benefits and advantages.

I claim:—

A hollow metal fishing rod composed of disconnectible sections, comprising in combination a metal tubular rod unit of substantially uniform cross-section and having a closed longitudinal joint, a bushing of a different practically-non-corrosive metal in one end thereof, a band encircling such end of the rod unit and having an inwardly extending flange covering the ends of the rod unit and its internal bushing, a second tubular metal rod unit having a closed lengthwise joint, and a ferrule of a substantially non-corrosive metal different from that of said unit fitted over an end of said second unit and of a diameter to fit in and be held by friction in said bushing.

In witness whereof I have hereunto set my hand and seal.

HARRY F. GEPHART. [L. s.]